Jan. 22, 1924.
J. TOMS
FASTENER FOR BELTS
Filed Nov. 13, 1922
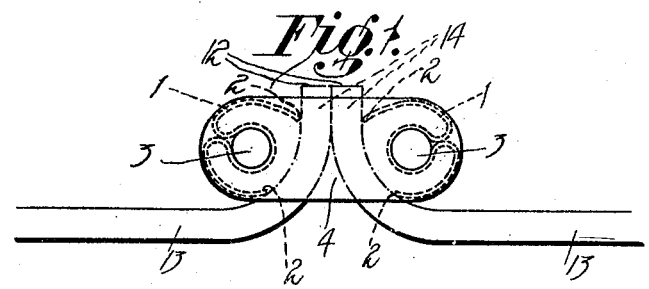
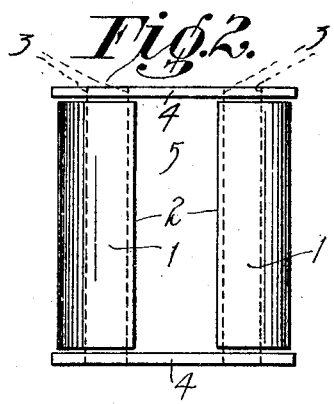
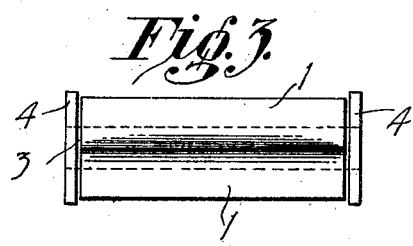
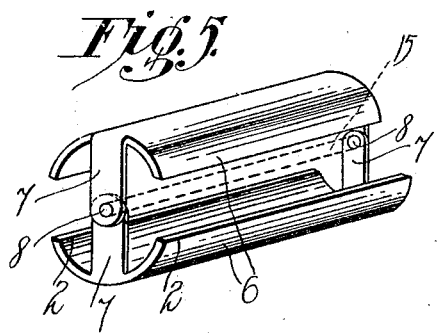
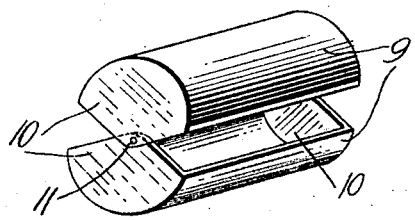
Inventor
John Toms Patented Jan. 22, 1924.

1,481,571

UNITED STATES PATENT OFFICE.

JOHN TOMS, OF KOHIMARAMA, AUCKLAND, NEW ZEALAND.

FASTENER FOR BELTS.

Application filed November 13, 1922. Serial No. 600,725.

*To all whom it may concern:*

Be it known that JOHN TOMS, a citizen of the Dominion of New Zealand, and resident of Taranaki Street, Kohimarama, in the Provincial District of Auckland, in the Dominion of New Zealand, has invented a certain new and useful Fastener for Belts, of which the following is a specification.

This invention relates to a device for fastening or joining the ends of belts and the like in a quick, simple and effective manner.

Hitherto devices of this class were defective for the reason that the ends of the belt were pierced or cut thus weakening the joint and increasing the wear and tear on the belt.

This invention has been devised in order to overcome the existing defects and to provide a grip fastener by the use of which the ends of the belt need not be pierced or cut and furthermore as the strain imparted on the belt or the like becomes greater so does the fastener impart a more secure and increasing grip.

The improved grip fastener is characterized by the use of two pivoted and partially rotatable grips spaced from and facing each other being preferably in the form of a part circle or curve, so that when the ends of the belt or the like are passed between the said pivoted grips and pressure is exerted thereon so that the grips bite more securely on to the belt ends.

In order that the invention may be more readily understood it will now be described with reference to the accompanying drawings in which:—

Figure 1 is a view in side elevation of the improved device showing the ends of a belt in fastened position.

Figure 2 is a view in plan and Figure 3 is a side view of the device illustrated in Figure 1.

Figure 4 is a view in perspective illustrating the formation of the grip and the pin upon which it is mounted when made from sheet metal.

Figure 5 is a view in perspective of an alternative means of mounting the grips.

Figure 6 is a view in perspective of further modified means for mounting the grips.

Figure 7 is a view in cross section of a modification.

According to this invention the gripping members 1 are pivotally mounted with the gripping edges 2 facing each other with the axes thereof in the same plane.

These members 1 in complete formation and on their outer surface assume the shape of a curve or semi-circle and are each shaped in one piece the ends forming the gripping edges 2 while the centre is shaped in the form of a loop 1ª around one of the pins 3.

Each gripping member 1 is thus free to move about the pins 3 which are spaced from each other and mounted at both ends to the spacing plates 4, the outer ends of the pins being burred or riveted.

In lieu of the grips 1 being formed of sheet metal they may be cast and formed with a hole 4ª to receive the pins 3 as illustrated in Figure 7.

The space 5 between the gripping members 1 is sufficient to allow of two ends 12 of a belt 13 or the like to pass therein.

The object of arranging the pivotal mountings 3 of the members 4 in the same plane is for the reason that when the belt ends 12 are placed between the gripping edges 2 the pull of each belt end being in opposite directions causes the upper edges 2 to move inwardly so that the greater the pull of the belt ends causes the upper edges 2 to bite more securely and this gripping effect is accelerated by the pull of the belt on the lower gripping edges 2.

In the modification illustrated in Figure 5 the members 6 are curved in cross section and are pivoted to each other in opposed positions as above described by providing right-angled inwardly extending ends 7 which are pivoted to each other at 8 by a rivet or by any other suitable means.

In the modification illustrated in Figure 6 the gripping jaws 9 preferably circular in cross section are provided with flattened right-angled ends 10 which are pivoted at 11 by riveting or by any other suitable means.

In both the constructions illustrated in Figures 5 and 6 the pivot member may be in the form of a spindle which forms the pivot for both ends of the grips as indicated by dotted lines 15, Figure 5.

In operation the two ends 12 of the belt 13 or the like to be connected or joined are bent at approximately right angles 14 and are inserted in the space 5 between the gripping jaws 1, 6 or 9 so as to pass right through between said jaws.

On a pulling strain being imparted on the belt or the like the lower edges or portions 2 of the members or jaws are forced apart with the result that the upper edges or portions 2 near the ends of the belt on the other side of the pivots are forced inwards so gripping the belt ends and functioning so that the greater the pulling strain on the belt or the like the greater the grip on the belt ends between the jaws.

The invention therefore consists essentially of a pair of gripping members or jaws oppositely disposed and operatively pivoted so that the ends of a belt or the like on being passed between them and on tension or pull being exerted on the belt an effective grip is imparted so fastening the said ends and I desire it to be understood that various modifications and improvements may be embodied without departing from the spirit and scope of the invention.

What I claim as my invention and desire to secure by Letters Patent is:—

1. An improved fastener for joining the ends of belts and the like comprising two pivoted gripping members curved in cross section and oppositely disposed and provided with right angled inwardly projecting ends and pivotally connecting said ends substantially as described.

2. An improved fastener for joining the ends of belts and the like comprising a pair of pivoted gripping members oppositely disposed of circular or other cross section forming the gripping members with flattened right angled ends and pivotally connecting said ends substantially as described.

Signed at Nelson, New Zealand, this twentieth day of September, 1922.

JOHN TOMS.

In the presence of—
PHILIP MOORE,
ROBT. LOVINSON.